(12) United States Patent
Otani

(10) Patent No.: US 11,840,060 B2
(45) Date of Patent: Dec. 12, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Ryosuke Otani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 17/674,889

(22) Filed: Feb. 18, 2022

(65) Prior Publication Data

US 2022/0266603 A1 Aug. 25, 2022

(30) Foreign Application Priority Data

Feb. 24, 2021 (JP) ................................. 2021-027635
Feb. 24, 2021 (JP) ................................. 2021-027642

(51) Int. Cl.
*B41J 2/045* (2006.01)
*B41J 2/21* (2006.01)
*G06K 15/10* (2006.01)
*B41J 2/155* (2006.01)

(52) U.S. Cl.
CPC .......... *B41J 2/2132* (2013.01); *B41J 2/0452* (2013.01); *B41J 2/04525* (2013.01); *B41J 2/04536* (2013.01); *B41J 2/04545* (2013.01); *G06K 15/107* (2013.01); *B41J 2/155* (2013.01)

(58) Field of Classification Search
CPC .. B41J 2/0452; B41J 2/04513; B41J 2/04525; B41J 2/04536; B41J 2/04545; B41J 2/155; G06K 15/107
See application file for complete search history.

(56) References Cited

U.S. PATENT DOCUMENTS 9,690,228 B2 6/2017 Otani
10,073,370 B2 9/2018 Takikawa et al.
10,194,053 B2 1/2019 Otani et al.
10,545,446 B2 1/2020 Takikawa et al.
11,020,985 B2 6/2021 Otani et al.
(Continued)

FOREIGN PATENT DOCUMENTS

CN 103129136 A * 6/2013 .......... B41J 2/04505
JP H05-330082 A 12/1993
JP 2008183742 A * 8/2008 .............. B41J 2/045

*Primary Examiner* — Julian D Huffman
(74) *Attorney, Agent, or Firm* — Carter, DeLuca & Farrell LLP

(57) ABSTRACT

In the technology of the present disclosure, multiple nozzles included in a printing head are stably driven while disparity in the usage frequency of each nozzle is suppressed. The dot counter scans the digital halftone data in the X direction and performs accumulation-counting on the pixel value Ixy (the number of printing dots) of each pixel for each address y with the accumulation counter CntCum(y). The signal value Gxy of the corresponding pixel address (x, y) is obtained from the division pattern memory unit. The nozzle selection unit selects the nozzle to be used for forming a printing dot, based on the counted values of the accumulation counter CntCum and the signal value Gxy of the division pattern. Then, the address n of the nozzle memory corresponding to the selected nozzle to form a printing dot is determined.

9 Claims, 19 Drawing Sheets

(56) References Cited

U.S. PATENT DOCUMENTS

| | | |
|---|---|---|
| 11,090,946 B2 | 8/2021 | Otani et al. |
| 2005/0122377 A1* | 6/2005 | Mizutani ................ B41J 2/2132 347/41 |
| 2013/0120485 A1* | 5/2013 | Kodama ............... G03F 7/0002 347/14 |
| 2013/0187969 A1* | 7/2013 | Miyahara ............... B41J 2/0458 347/14 |
| 2020/0349405 A1 | 11/2020 | Otani et al. |
| 2021/0155009 A1 | 5/2021 | Otani |
| 2021/0158112 A1 | 5/2021 | Otani et al. |

* cited by examiner

|   | X→ | | | | | | | | | | | | |
|---|---|---|---|---|---|---|---|---|---|---|---|---|---|
| Y↓ | 0 | 1 | 2 | 3 | 4 | 5 | 6 | 7 | 8 | 9 | 10 | 11 | 12 |
| 0 | 1 | 2 | 2 | 1 | 0 | 0 | 0 | 0 | 0 | 2 | 3 | 3 | 3 |
| 1 | 0 | 1 | 2 | 2 | 1 | 0 | 0 | 0 | 0 | 2 | 3 | 3 | 3 |
| 2 | 0 | 0 | 1 | 2 | 2 | 1 | 0 | 0 | 0 | 2 | 3 | 3 | 3 |
| 3 | 0 | 0 | 0 | 1 | 2 | 2 | 1 | 0 | 0 | 2 | 3 | 3 | 3 |
| 4 | 0 | 0 | 0 | 0 | 1 | 2 | 2 | 1 | 0 | 2 | 3 | 3 | 3 |
| 5 | 0 | 0 | 0 | 0 | 0 | 1 | 2 | 2 | 1 | 2 | 3 | 3 | 3 |
| 6 | 0 | 0 | 0 | 0 | 0 | 0 | 1 | 2 | 2 | 2 | 3 | 3 | 3 |
| 7 | 0 | 0 | 0 | 0 | 0 | 0 | 0 | 1 | 2 | 2 | 3 | 3 | 3 |
| 8 | 0 | 0 | 0 | 0 | 0 | 0 | 0 | 0 | 1 | 2 | 3 | 3 | 3 |
| 9 | 0 | 0 | 0 | 0 | 0 | 0 | 0 | 0 | 0 | 1 | 3 | 3 | 3 |

FIG.17

INFORMATION PROCESSING APPARATUS, INFORMATION PROCESSING METHOD, AND STORAGE MEDIUM

BACKGROUND OF THE INVENTION

Field of the Invention

The present disclosure relates to an information processing technology for controlling a printing apparatus.

Description of the Related Art

Conventionally, as an image printing apparatus, an inkjet printing apparatus that forms a desired image on a print medium by relatively moving the print medium and a printing head in which multiple nozzles are arranged and ejecting ink droplets (printing dots) from the nozzles has been widely used.

Regarding each nozzle arranged in the printing head, since the ejection characteristics vary due to the manufacturing processes, the configuration materials, or the like of the printing head, there is a problem that streaks or density nonuniformity occur to an image that should be essentially even. A divided printing method is well known as a method for solving the reduction in the printing quality associated with such variation in the ejection characteristics of each nozzle. In this divided printing method, by forming printing on one printing line in a divided manner with printing dots that are ejected from multiple different nozzles, the variation in the ejection characteristics for each nozzle is averaged on the printing line, so that streaks and density nonuniformity of the appearance can be reduced.

In Japanese Patent Laid-Open No. H05-330082, a printing method using sequential multi-scan (hereinafter referred to as SMS), which is one of the divided printing methods, is disclosed. According to this, the multiple printing dots that are to be formed on one printing line of the print medium which is designated by input image data are sequentially allocated to the multiple nozzles included in the printing head. Therefore, in the method disclosed in Japanese Patent Laid-Open No. H05-330082, the printing dots on the same printing line can be approximately evenly distributed to the multiple nozzles for input image data of any kinds of arrangement.

In a case where such SMS is applied to a full-line type printing head or the like that includes multiple nozzle arrays and is capable of forming printing dots on multiple printing lines at the same time, the printing dots to be formed on the same line can be approximately evenly distributed to the multiple nozzle arrays. However, if image data with unbalanced arrangement of dots is input, even though different nozzle arrays are firstly allocated to the respective printing lines, in the course of the respective nozzle arrays being allocated sequentially, the nozzle arrays allocated to multiple printing lines may incidentally overlap. As a result, there is a problematic case in which driving of nozzles becomes unstable since the ejection timings of multiple nozzles overlap in a specific nozzle array, which causes shortage of the capacity of the power source for driving the nozzles.

SUMMARY OF THE INVENTION

To solve the above-described problems, the technology of the present disclosure relates to an information processing apparatus for controlling a printing apparatus including a printing head in which a plurality of nozzle arrays having a plurality of nozzles that eject ink being aligned in a predetermined direction are arranged, so as to perform printing of each pixel with each nozzle set, which includes one nozzle each from each nozzle array, and the information processing apparatus includes: an obtainment unit configured to obtain digital halftone data which is configured with a plurality of pixels each of which holds a pixel value indicative of the number of printing dots to be formed with ink that is ejected from nozzles; an allocation unit configured to set a plurality of nozzle groups that evenly divide the plurality of nozzles included in each nozzle set and allocate one of the plurality of nozzle groups to each pixel of the digital halftone data so that appearance frequencies of the respective nozzle groups are approximately even; and a selection unit configured to select the number of nozzles corresponding to a pixel value of a pixel from among a plurality of nozzles that are set as one of the nozzle groups allocated to the pixel out of a plurality of nozzles included in the nozzle set corresponding to each pixel of the digital halftone data, so that disparity in the number of times of selection is reduced, and output a signal indicative of the selected nozzles in association with the pixel.

Further features of the present invention will become apparent from the following description of exemplary embodiments with reference to the attached drawings.

BRIEF DESCRIPTION OF THE DRAWINGS

FIG. 17 is a diagram illustrating an example of digital halftone data;

DESCRIPTION OF THE EMBODIMENTS

Hereinafter, an explanation will be given of each embodiment with reference to the drawings. Note that the embodiments below do not necessarily limit the present disclosure. Further, every combination of the characteristics explained in each embodiment is not necessarily essential to the solution provided by the present disclosure.

First Embodiment

Figure 1:
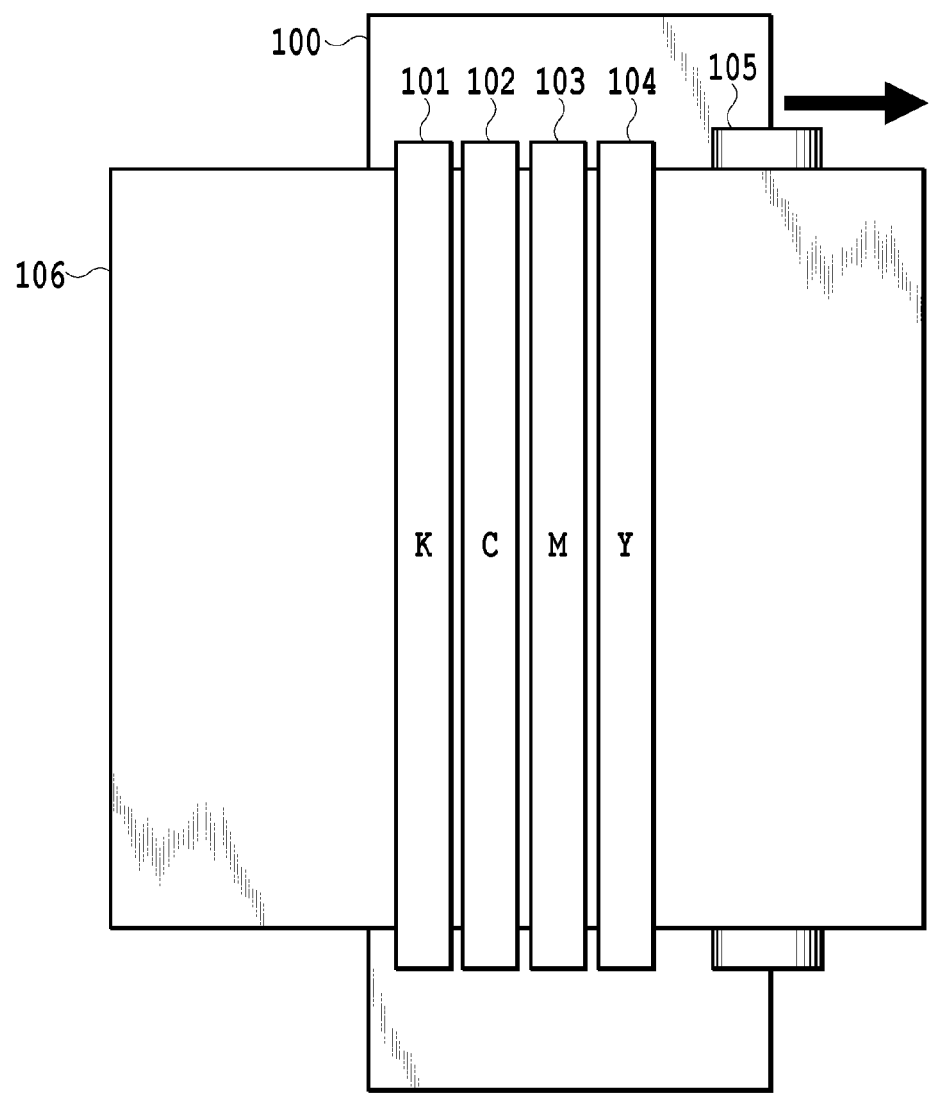
FIG. 1 is a diagram schematically illustrating an inkjet printer.

FIG. 1 is a diagram schematically illustrating an inkjet printer (inkjet printing apparatus) according to the present embodiment. As illustrated in FIG. 1, the printer 100 includes the printing heads 101 to 104 on a frame which is a structural member of the printer. Note that the printing heads 101 to 104 eject ink of multiple different colors. i.e., black (K), cyan (C), magenta (M), and yellow (Y), respectively. Further, the printing heads 101 to 104 are what is termed as a full-line type, which includes a nozzle array in which multiple nozzles are arranged along a predetermined direction in a range corresponding to the width of the printing paper 106. In the present embodiment, the resolution of the nozzle arrangement of a nozzle array included in each of the printing heads 101 to 104 is 600 dpi.

The conveyance roller 105 (and other rollers which are not illustrated in the drawings) is rotated by a driving force of a motor (not illustrated in the drawing), and thereby the printing paper 106, which is a print medium, is conveyed in the direction of the arrow of the drawing.

By repeating such an ink ejection operation from each printing head to the conveyed printing paper as described above, an image corresponding to one page can be printed, for example.

Figure 2:
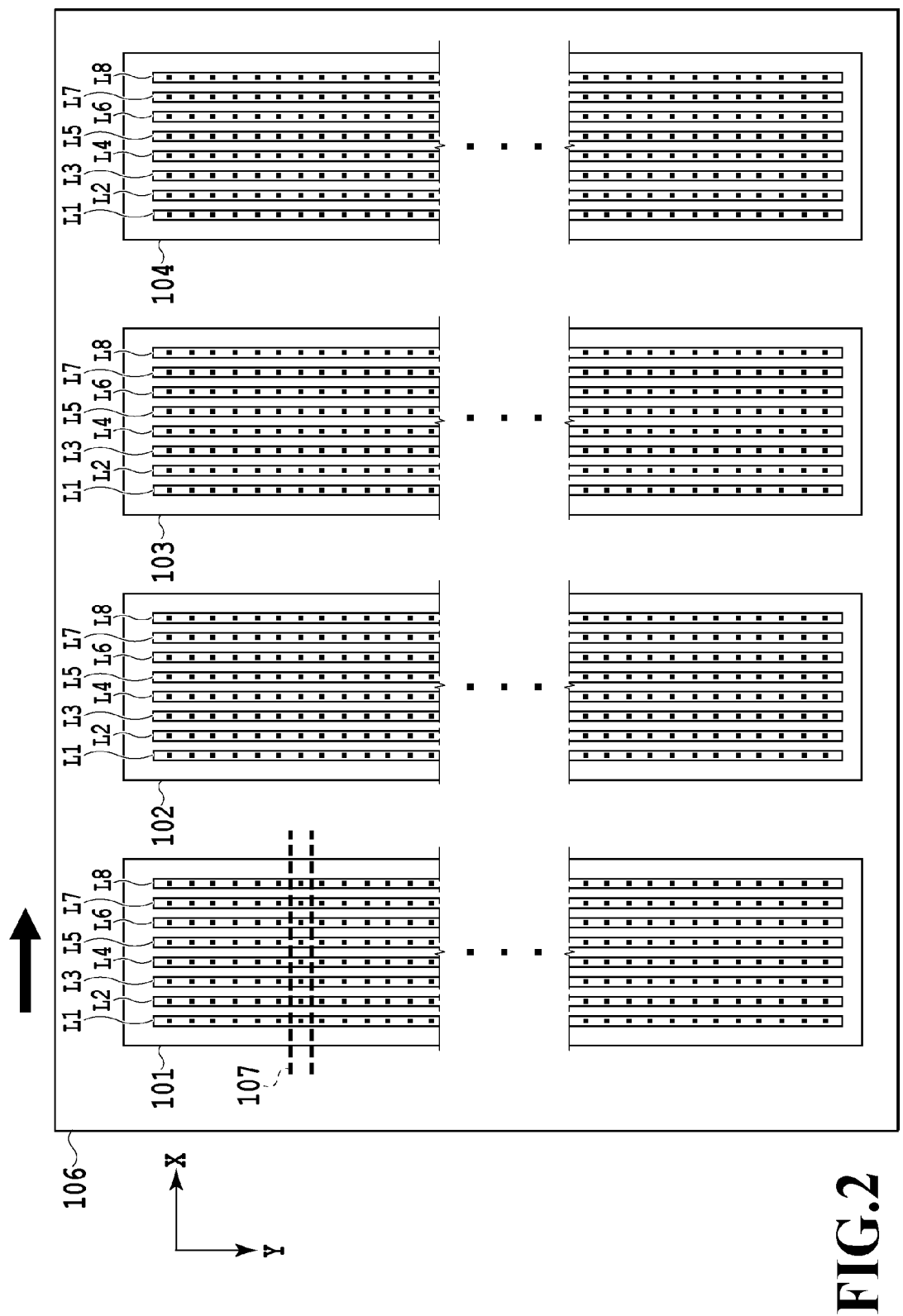
FIG. 2 is a block diagram schematically illustrating printing heads.

Further, as illustrated in FIG. 2, in the conveyance direction (X direction), the printing heads 101 to 104 respectively include multiple nozzle arrays in which multiple nozzles that eject an ink droplet are evenly arranged in a predetermined direction (Y direction). Ink is ejected to the printing paper 106 which relatively moves in the direction indicated by the arrow in the drawing, so as to form printing dots on the printing line 107 of the printing paper 106 in a shared manner with multiple nozzle arrays L1 to L8.

The nozzle arrays L1 to L8 included in the printing heads 101 to 104 are equipped with ejection energy generation units such as heaters for the respective nozzles, and these heaters are driven by an electric power source which is common for each nozzle array.

With respect to the given printing line 107 which is printed by one of the printing heads 101 to 104, the printing dots on the printing line 107 can be formed by ejection or not-ejection of each nozzle of the nozzle arrays L1 to L8. Further, the nozzle arrays L1 to L8 are divided into multiple nozzle groups for processing. In the present embodiment, it is assumed that the nozzle arrays L1 to L4 correspond to the nozzle group 0 and the nozzle arrays L5 to L8 correspond to the nozzle group 1.

<System Configuration>

Figure 3:
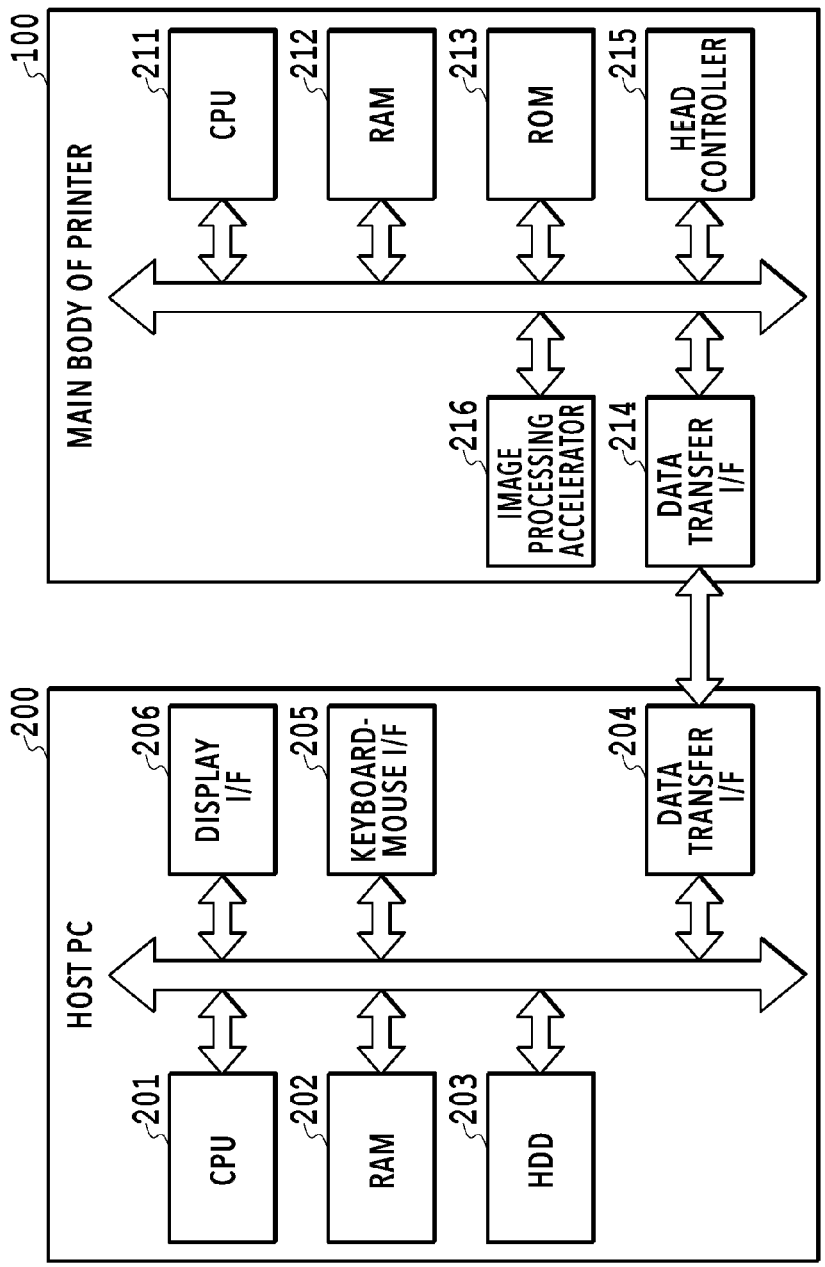
FIG. 3 is a block diagram of a printing system.

FIG. 3 is a block diagram illustrating the printing system configured to include the printer illustrated in FIG. 1 and the personal computer (PC) 200 as a host apparatus.

The host PC 200, which is the information processing apparatus of the present embodiment, is configured to mainly include the following elements. The CPU 201 executes processing according to a program held in the HDD 203 or the RAM 202 which is a memory unit. The RAM 202 is a volatile memory unit, which temporarily holds a program or data. The HDD 203 is a non-volatile memory unit, which holds a program or data as well. The data transfer I/F (interface) 204 controls transmission and reception of data to and from the printer 100. As the connection system for this data transmission and reception, USB, IEEE1394, LAN, or the like can be used. The keyboard-mouse I/F 205 is an I/F that controls an HID (Human Interface Device) such as a keyboard and a mouse, and thus an input can be performed by the user via this I/F. The display 1/F 206 controls displaying on a display (not illustrated in the drawings).

On the other hand, the printer 100 is configured to mainly include the following elements. The CPU 211 executes processing according to a program held in the ROM 213 or the RAM 212. The RAM 212 is a volatile memory unit, which temporarily holds a program or data. The ROM 213 is a non-volatile memory unit, which can hold a program or data.

The data transfer I/F 214 controls transmission and reception of data to and from the PC 200. The head controller 215 supplies printing data to the line head of each printing head illustrated in FIG. 2 and controls the ejection operation of the printing head. Specifically, the head controller 215 reads a control parameter and printing data from a predetermined address of the RAM 212. Further, if the CPU 211 wrights the control parameter and printing data to a predetermined address of the RAM 212, processing is thereby activated by the head controller 215, so as to perform ink ejection from the printing heads.

The image processing accelerator 216 is hardware capable of executing image processing at a higher speed than the CPU 211. Specifically, the image processing accelerator 216 reads a parameter and data required for image processing from a predetermined address of the RAM 212. Further, if the CPU 211 writes the above-described parameter and data to the above-described predetermined address of the RAM 212, the image processing accelerator 216 is thereby activated, so as to perform predetermined image processing on the above-described data. Note that the image processing accelerator 216 is not an essential element, and it is also possible that the image processing is executed by processing of the CPU 211, depending on the specifications of the printer.

<Processing to be Executed by the Information Processing Apparatus>

Figure 4:
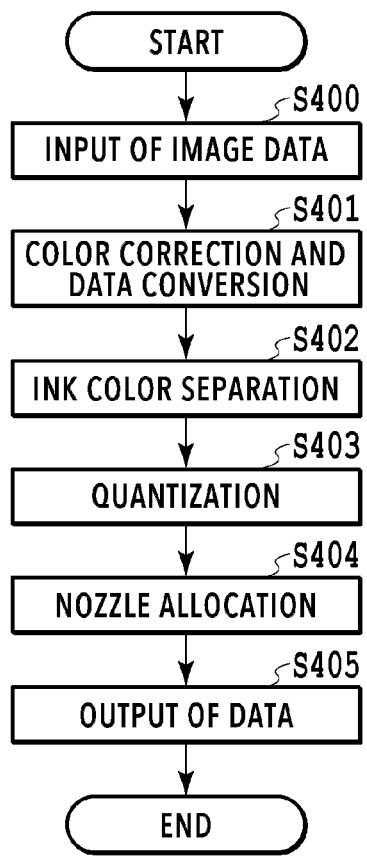
FIG. 4 is a flowchart illustrating processing of image data according to an embodiment.

FIG. 4 is a flowchart for explaining the processing of image data in the present embodiment. The present processing is executed by the CPU 201 included in the host PC 200 according to a program.

First, in S400, the CPU 201 of the host PC 200 reads input image data from the RAM 202. The input image data is 8-bit luminance data of R (red), G (green), and B (blue) for expressing a standardized color space such as sRGB.

In S401, the CPU 201 executes color correction on the read input image data and converts the input image data, which is 8-bit luminance data, into RGB 12-bit luminance data corresponding to a color space that is unique to the printer. As the method for converting signal values, it is possible to adopt a publicly-known method including referring to a look-up table (LUT) stored in advance in a memory device such as the HDD 203.

In S402, the CPU 201 separates the RGB 12-bit luminance data after the data conversion into 16-bit tone data (density data) of each of the ink colors of the printer 100, i.e., C (cyan), M (magenta), Y (yellow), and K (black). At this stage, 16-bit images are generated for four channels (for four colors). As with the color correction process, in the ink color separation process, it is possible to refer to a look-up table (LUT) stored in advance in a ROM or the like.

In S403, the CPU 201 performs a quantization process on the CMYK 16-bit tone data. For example, as for multi-order color data from the quantization process, in a case where quantization into four values is performed, the pixel value of each pixel is 2-bit data representing 3-dot printing (3), 2-dot printing (2), 1-dot printing (1), or not-printing (0).

In S404, the CPU 201 performs the nozzle allocation process in which nozzles that form the number of printing dots indicated by the pixel value of each pixel of the quantized image data from among a nozzle set which is composed of multiple nozzles arranged on the same printing line of the multiple nozzle arrays. A nozzle set includes one nozzle each from each nozzle array, and the number of nozzle sets is the same as the number of nozzles included in each nozzle array. Each pixel of image data is associated with any one of multiple nozzle sets, and the printing dots of each pixel are formed by the nozzles included in the nozzle set that is associated with each pixel. The detailed explanation of the nozzle allocation process in S404 will be described later with reference to FIG. 8.

In S405, for each nozzle set associated with each pixel on which the nozzle allocation process has been performed, the CPU 201 outputs printing dot data, which includes binary data representing ejection or not-ejection of ink of each nozzle for the number of nozzles, to the RAM 212 of the printer 100. In the present embodiment, since each nozzle set includes eight nozzles, the printing dot data has 8 bits per pixel. Thereafter, the processing on image data in the present embodiment ends.

Note that, although each process shown in each step of FIG. 4 is performed in the inkjet printing system of the present embodiment, there is no such clear division in particular of until which process the host PC 200 performs and from which process the printer 100 performs. For example, in a case where the host PC 200 performs up to the quantization, the quantized data may be transferred to the printer 100. Further, depending on the performance of the printer 100, it is also possible to directly receive multi-valued RGB image data and perform all of the processes of S401 to S405. Note that, although the information processing apparatus that performs the image processing is the host PC 200 in the present embodiment, in a case where the above-described processing is performed in a shared manner in the printing system including the printer 100 and the host PC 200, the printing system functions as the information processing apparatus.

<Functional Configuration of the Information Processing Apparatus>

Figure 5:
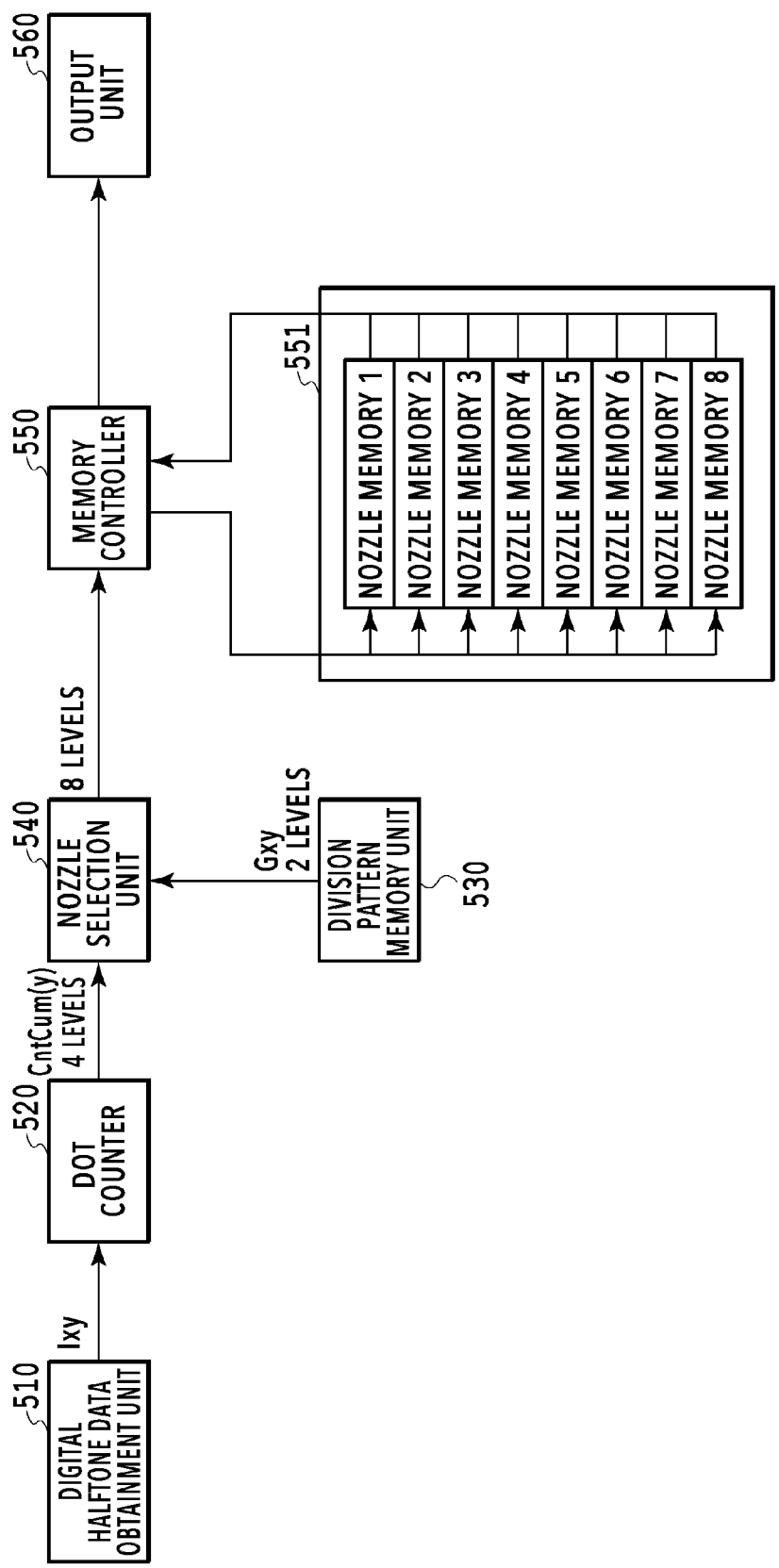
FIG. 5 is a block diagram illustrating a functional configuration of a nozzle allocation process according to the first embodiment.
Figure 6:
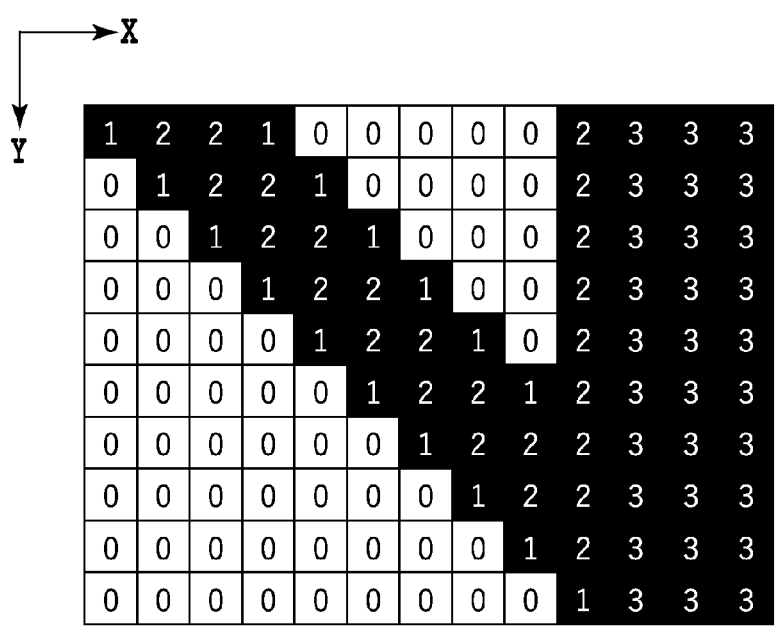
FIG. 6 is a diagram illustrating an example of digital halftone data.

FIG. 5 is a block diagram representing the functional configuration of the information processing apparatus for the nozzle allocation process according to the first embodiment. In FIG. 5, the digital halftone data obtainment unit 510 outputs the pixel value Ixy which represents the number of printing dots in a target pixel (x, y) of digital halftone data. Here, x represents an address corresponding to the conveyance direction of the print medium, and y represents an address corresponding to the nozzle arranging direction of the printing heads. FIG. 6 is an example of digital halftone data, and each pixel holds the number of printing dots of 2 bits (0 to 3 dots).

Returning to FIG. 5, the dot counter 520 scans the digital halftone data in the X direction and performs accumulation-counting on the pixel value Ixy (the number of printing dots) of each pixel for each address y with the accumulation counter CntCum(y). Note that the accumulation counter CntCum(y) is a 2-bit (4-level) counter, which can hold the counted value of "0", "1", "2", or "3" as the counted value, and, if counting further up from the maximum level "3", the counted value returns to "0".

Figure 7:
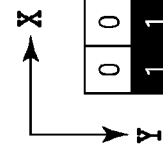
FIG. 7A is a diagram illustrating an example of a nozzle division pattern according to the first embodiment.
FIG. 7B is a diagram illustrating an example of a nozzle division pattern according to the first embodiment.

530 in the drawing is the nozzle division pattern memory unit, and the signal value Gxy of a division pattern which is stored in the division pattern memory unit 530 represents allocation of a nozzle group in the target pixel (x, y). The division pattern 710 illustrated in FIG. 7A is an example of the division pattern in the present embodiment, in which two groups indicated by "0" or "1" (the nozzle group 0 or nozzle group 1) are arranged.

In the arrangement of the division pattern 710, the appearance frequencies of the respective nozzle groups are the same in each row in the X direction and in each column in the Y direction. Further, it is desirable that pixels in which the same nozzle group is allocated are not arranged side by side in the Y direction. Note that, as illustrated in FIG. 7B, the division pattern 710 is set so as to be arranged in a repeated manner like tiles on the entire digital halftone data, so that nozzle groups correspond to all the pixels. Further, in each direction, the appearance frequencies of the respective nozzle groups in the arrangement need not be completely the same and may be approximately even.

Returning to FIG. 5, the nozzle selection unit 540 selects nozzles to be controlled to eject ink in each nozzle set, based on outputs from the dot counter 520 and the division pattern memory unit 530. Further, the nozzle selection unit 540 determines the addresses corresponding to the selected nozzles from among the addresses of the nozzle memories 1 to 8 of the memory 551. The memory 551 is a 1-bit line memory that stores ejection or not-ejection from the nozzles included in each nozzle set of the printing heads 101 to 104 on a per pixel basis for the number of nozzle sets (the number of nozzles included in each nozzle array). Each of the nozzle memories 1 to 8 stores ejection "1" or not-ejection "0" of a nozzle of the nozzle arrays L1 to L8.

The memory 551 is divided into two groups according to the division pattern of the nozzle groups stored in the division pattern memory unit 530. For the pixels corresponding to "0" in the division pattern 710 of FIG. 7A and FIG. 7B, an address of any one of the nozzle memories 1 to 4 is selected if the pixel value Ixy is one or more. On the other hand, for the pixels corresponding to "1" in the division pattern 710, an address of any one of the nozzle memories 5 to 8 is selected if the pixel value Ixy is one or more. That is, an address in the 8-level nozzle memories is determined based on the four levels of the accumulation counter CntCum(y) of the dot counter 520 and the two levels of the division pattern 710.

The memory controller 550 sets "1" to any one of the nozzle memories 1 to 8 in the memory 551, which is determined by the nozzle selection unit 540, or sets "0" to all the nozzle memories 1 to 8 (initialization). Further, the memory controller 550 reads out the data stored in the memory 551 for an output.

The output unit 560 outputs the output data which is configured with signals that are set for the nozzle memories 1 to 8. The output data is 8-bit data indicative of ejection or not-ejection of each nozzle in the respective nozzle arrays of the printing heads 101 to 104.

With the above-described configuration, the nozzles to be controlled to eject ink for forming the printing dots of each pixel of digital halftone data are selected, and the nozzle memories Mem(n, y)(n=1 to 8) corresponding to the selected nozzles are determined. The detailed flow thereof will be explained below.

Figure 8:
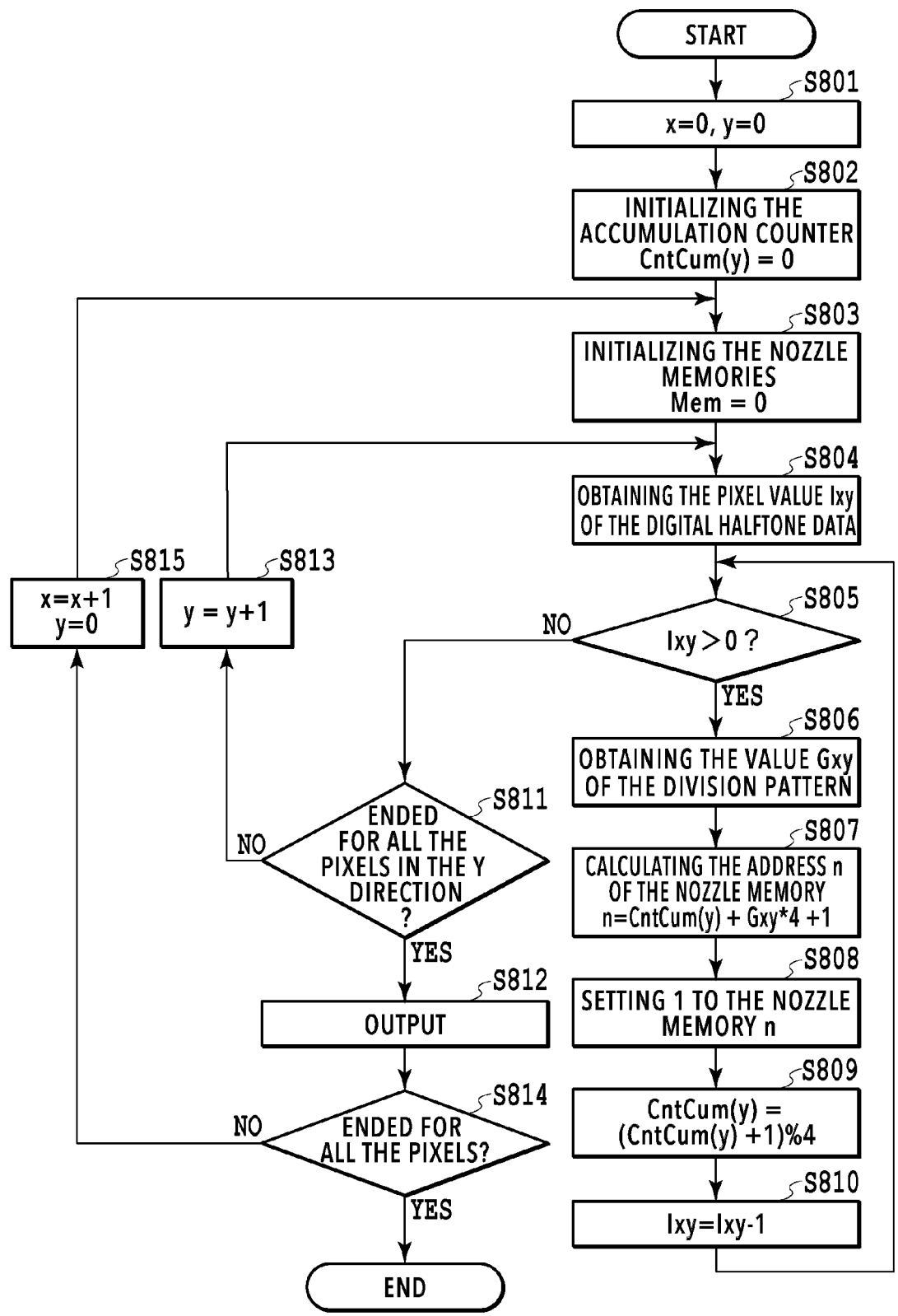
FIG. 8 is a flowchart of the nozzle allocation process according to the first embodiment.

FIG. 8 is a flowchart illustrating the processing procedure of allocating nozzles for digital halftone data in the first embodiment.

In S801, the parameters x and y, which relate to a pixel address of the obtained digital halftone data, are initialized.

In S802, the accumulation counter CntCum(y) in the X direction (the conveyance direction) is initialized (CntCum(y)=0).

In S803, the memory controller 550 initializes the nozzle memories 1 to 8 of the memory 551 to set "0" to all the memories.

In S804, the digital halftone data obtainment unit 510 obtains the pixel value Ixy of the pixel address (x, y) of the digital halftone data.

In S805, the nozzle selection unit 540 determines whether or not the pixel value Ixy is greater than 0. In a case where Ixy is 0, the processing proceeds to S811, and, in a case where Ixy is greater than 0, the processing proceeds to S806.

In S806, the signal value Gxy of the corresponding pixel address (x, y) is obtained from the division pattern memory unit 530.

In S807, the nozzle selection unit 540 selects the nozzle to be used for forming a printing dot, based on the 4-level ("1" to "4") counted values of the accumulation counter CntCum and the signal value Gxy of the 2-level ("0", "1") division pattern. Then, with the formula below, the nozzle selection unit 540 determines the address n of the nozzle memory corresponding to the selected nozzle for which "1", which is indicative of causing the nozzle to form a printing dot with ink, is to be stored.

$$n = CntCum(y) + Gxy \times 4 + 1 \quad \text{(Formula 1)}$$

In S808, the memory controller 550 sets "1" to the nozzle memory Mem(n, y) corresponding to the address n of the nozzle memory in which "1", which is indicative of causing the nozzle to form a printing dot, is to be stored.

In S809, the accumulation counter CntCum(y) counts up.

$$CntCum(y) = (CntCum(y) + 1)\%4 \quad \text{(Formula 2)}$$

Here, % is a remainder operator, which is an operation that obtains a remainder. Accordingly, a 2-bit (4-level) counted value is obtained.

In S810, 1 is subtracted from Ixy to newly set the obtained value as Ixy, and then the processing returns to S805.

If Ixy is 0 in S805 and the processing proceeds to S811, whether or not the nozzle allocation for the pixels in the nozzle arranging direction (the Y direction) of the printing head in the address x of the digital halftone data has ended is determined in S811. In a case where the nozzle allocation for the pixels in the Y direction in the address x has ended, the processing proceeds to S812, and, if not, the processing proceeds to S813.

In S812, regarding the pixels having the address x of the digital halftone data, the output unit 560 reads out the signals indicative of the nozzles that are selected for forming the printing dots of those pixels from the memory 551 for an output.

In S813, the pixel address is progressed by one pixel in the Y direction (x, y+1), and the processes from S804 are repeated.

In S814, whether the nozzle allocation has ended for all the pixels in the digital halftone data is determined, and, if the nozzle allocation has ended, the series of the nozzle allocation process will end, and, if not, the processing proceeds to S815.

In S815, the address x is progressed by one and the address y is initialized (x=x+1, y=0), and the processing returns to S803.

Figure 9:
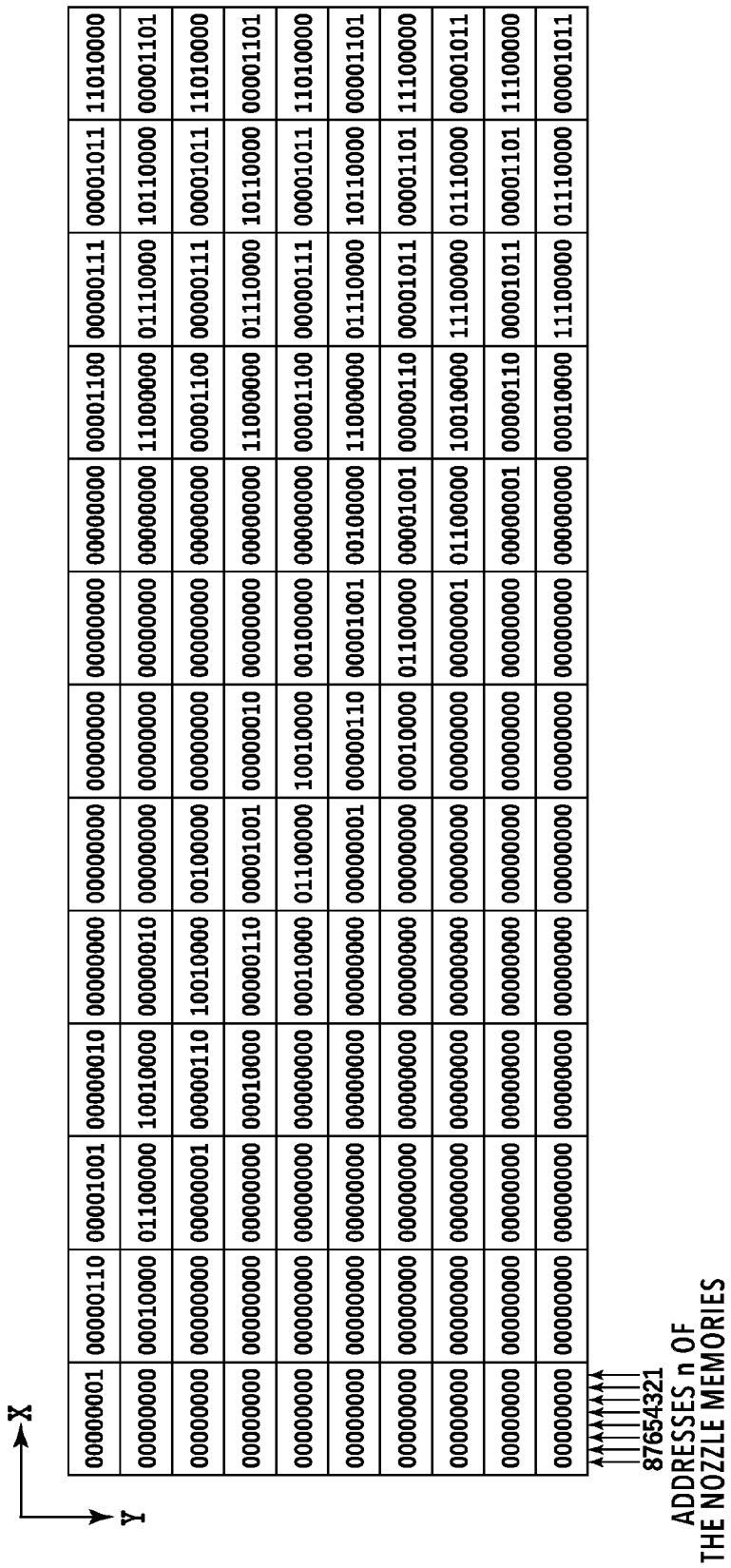
FIG. 9 is a diagram illustrating a result of the nozzle allocation process according to the first embodiment.

In FIG. 9, a result of the nozzle allocation performed on the digital halftone data illustrated in FIG. 6 by the above-described processing is illustrated. The 8-bit numerical value of each cell (x, y) of the drawing is indicative of the output values (printing "1", not-printing "0") for the respective nozzle memories 1 to 8 corresponding to each pixel (x, y) of the digital halftone data. As illustrated in the drawing, in each cell, "1" is set for the number of nozzle memories corresponding to the pixel value Ixy (the number of printing dots) of each pixel in the digital halftone data. In a case where Ixy is 0, "0" is set for all the nozzle memories. In a case where Ixy is 1, 2, or 3, "1" is set for one, two, or three nozzle memories of the eight memories in the respective cases, and "0" is set for the other nozzle memories.

Note that, as defined in Formula 1, the address n of the nozzle memories at which "1", which is indicative of causing the nozzle to form a printing dot, is to be stored is determined based on the 4-level counted values of the accumulation counter CntCum(y) and the signal value Gxy of the 2-level division patterns. Regarding the pixel (x+1, y) and the pixel (x, y) that belong to the same nozzle group and are adjacent to each other in the X direction, the address of the nozzle to be firstly allocated for the pixel (x+1, y) is the address next to the address of the nozzle that was lastly allocated for the pixel (x, y). For example, in the example illustrated in FIG. 9, the address n of the nozzle memories at which the printing dot (1 dot) of the pixel (0, 0) is allocated is "1", and the addresses n of the nozzle memories at which the printing dots (2 dots) of the pixel (1, 0) are allocated are "2" and "3". Further, the addresses n of the nozzle memories at which the printing dots (2 dot) of the pixel (2, 0) are allocated are "4" and "1". Note that, in a case where the nozzle group is "0", the address n returns to "1" if exceeding "4", and, in a case where the nozzle group is "1", the address n returns to "5" if exceeding "8".

In the present embodiment, the nozzle groups in the 2-level division pattern are arranged so that the appearance frequencies of the respective nozzle groups are the same (½ each) in each row in the X direction and in each column in the Y direction. The printing dots allocated to different nozzle groups (in the present embodiment, the nozzle memory group 1 to 4 and the nozzle memory group 5 to 8) are not to be ejected at approximately the same time. Therefore, in the present embodiment, the number of nozzles that are driven at approximately the same time in each nozzle array can be suppressed to ½ of all the nozzles included in each nozzle array at maximum, and it is possible to suppress disparity in the number of times of selection and the usage frequency of each nozzle.

Further, regarding the X direction, the address of the nozzle memories is changed in four levels, based on the accumulation counter CntCum(y) that counts up each time a printing dot appears in a sequential manner without including not-printing data. Therefore, it is possible to perform printing in a divided manner with nozzles of at least four or more nozzle arrays.

Further, in the present embodiment, regarding the Y direction, by using a division pattern in which pixels that belong to the same nozzle group are not adjacent to each other, it is possible to prevent adjacent nozzles in the same nozzle array from being driven at approximately the same timing. Accordingly, it is possible to suppress deterioration in image quality due to an effect of "crosstalk", in which the amount of ejected ink (the amount of droplets) and the ejection speed are changed because of presence/absence of ejection from adjacent nozzles in the same nozzle array, and beading, in which multiple dots ejected from adjacent nozzles are united before being dried.

As described above, with the present configuration, in a printing apparatus equipped with a print head in which multiple nozzle arrays including multiple nozzles aligned in a predetermined direction are arranged, it is possible to suppress the number of nozzles that eject at the same time in each nozzle array and to suppress disparity in the number of times of selection and the usage frequencies of the nozzles.

Modification Example

Figure 10:
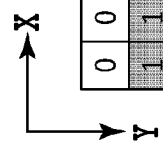
FIG. 10A is a diagram illustrating an example of a nozzle division pattern according to the first embodiment.
FIG. 10B is a diagram illustrating an example of a nozzle division pattern according to the first embodiment.

In the present modification example, the division example in which the number of nozzles to be driven at the same time in the same nozzle array is suppressed to ¼ of all the nozzles at maximum by use of a 4-level division pattern will be explained. FIG. 10A is an example of the division pattern in the present embodiment, in which four nozzle groups indicated by "0", "1", "2", or "3" are arranged. Regarding the arrangement in the division pattern, as with the explanation of FIG. 7A and FIG. 7B, the appearance frequencies of the respective groups are the same in each row in the X direction and in each column in the Y direction. Further, it is desirable that pixels that belong to the same nozzle group are not arranged side by side in the Y direction. Moreover, as illustrated in FIG. 10B, the nozzle division pattern is arranged in a repeated manner like tiles on the entire digital halftone data, so that the nozzle groups respectively correspond to all the pixels.

For the pixels corresponding to "0" in the division pattern of FIG. 10A and FIG. 10B, an address of either one of the nozzle memories 1 and 2 is selected. For the pixels corresponding to "1" in the division pattern, an address of either one of the nozzle memories 3 and 4 is selected. For the pixels corresponding to "2" in the division pattern, an address of either one of the nozzle memories 5 and 6 is selected. For the pixels corresponding to "3" in the division pattern, an address of either one of the nozzle memories 7 and 8 is selected.

Further, the dot counter 520 in the present modification example is a 1-bit (2-level) counter that scans the digital halftone data in the X direction to perform accumulation-counting of the pixel value Ixy (the number of printing dots) of each pixel with the counter CntCum(y). The counted value returns to 0 if exceeding the maximum level, and the counting is continued. With these configurations, in the present modification example, an address in the 8-level nozzle memories can be determined based on the two levels of the dot counter CntCum(y) and the four levels of the division pattern 1010.

Figure 11:
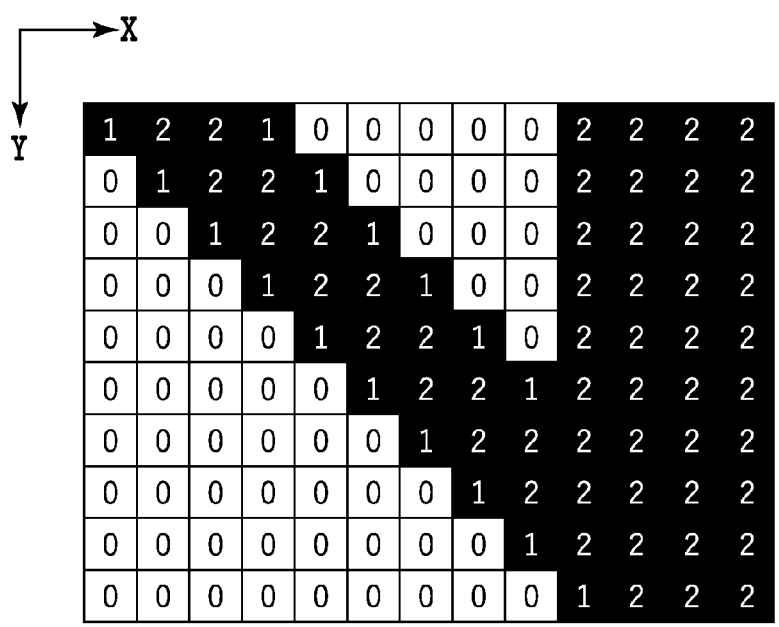
FIG. 11 is a diagram illustrating an example of digital halftone data.

FIG. 11 is an example of digital halftone data that is applicable in the present modification example. Note that, in the present modification example, the number of nozzles that can be assigned in one nozzle group is 2 (the number of levels of the accumulation counter CntCum(y) is 2). Therefore, in the applicable digital halftone data, the pixel value Ixy (the number of printing dots) of each pixel excluding not-printing "0" needs to be 2 or less. Thus, the explanation here is given by use of the digital halftone data in which the 2-level numbers of printing dots excluding not-printing "0" (3-level numbers of printing dots, i.e., 0 to 2 dots, if the not-printing is added) are held.

Figure 12:
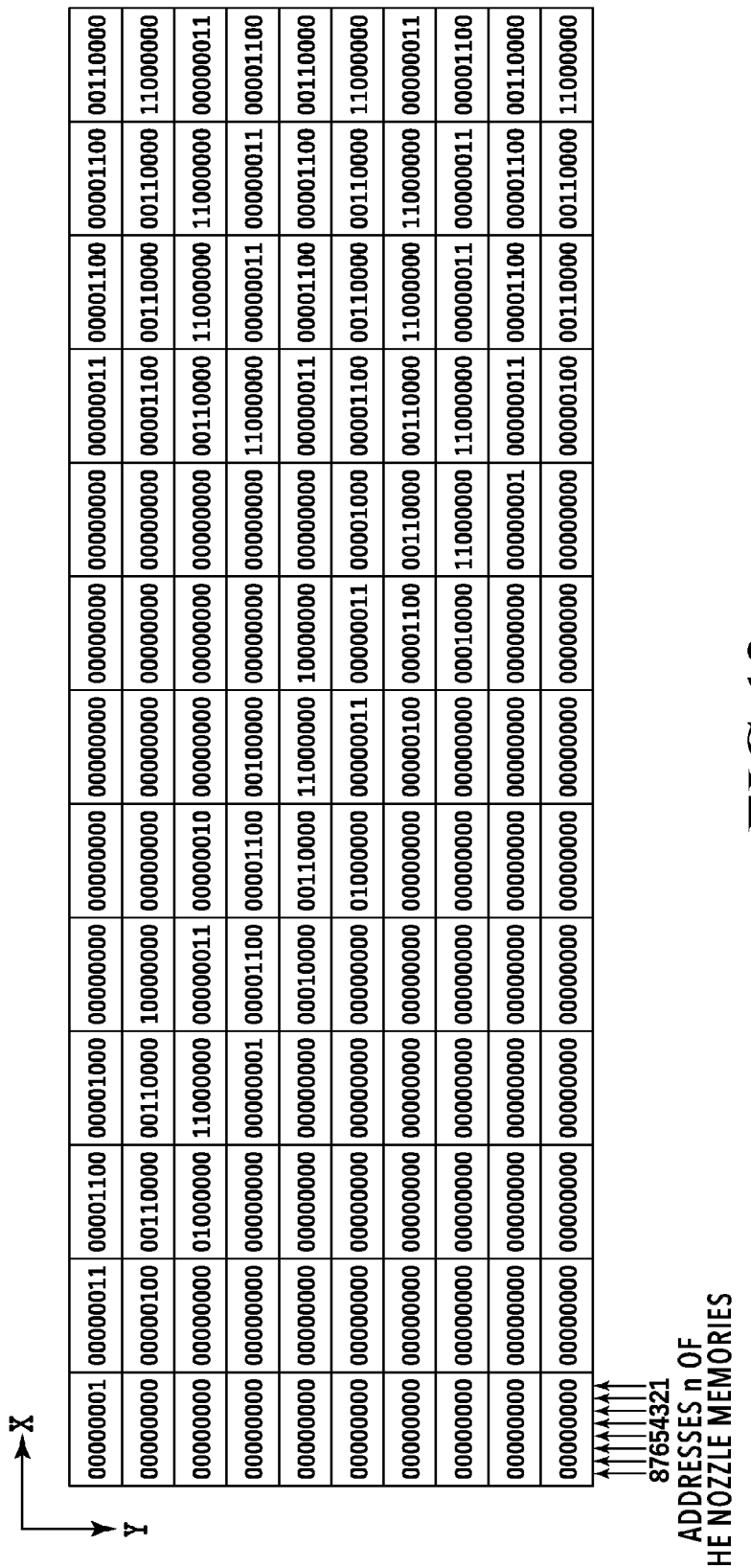
FIG. 12 is a diagram illustrating a result of the nozzle allocation process according to the first embodiment.

In FIG. 12, a result of the nozzle allocation performed on the digital halftone data illustrated in FIG. 11 by the above-described processing is illustrated. The numerical value of each cell (x, y) of the drawing is indicative of the output values (printing "1", not-printing "0") to be stored in the respective nozzle memories n (n=1 to 8) corresponding to each pixel (x, y) of the digital halftone data. As illustrated in the drawing, "1" is set for the number of nozzle memories corresponding to the pixel value Ixy (the number of printing dots) in the digital halftone data. In a case where Ixy is 0, "0" is set for all the nozzle memories. In a case where Ixy is 1 or 2, "1" is set for one or two nozzle memories of the eight nozzle memories in the respective cases, and "0" is set for the other nozzle memories.

Further, the address n of the nozzle memories at which the value "1", which is indicative of causing the nozzle to form a printing dot, is to be stored is determined by the formula below, based on the 2-level counted values of the accumulation counter CntCum(y) and the signal value Gxy of the 4-level division pattern.

$$n = CntCum(y) + Gxy \times 2 + 1 \qquad \text{(Formula 3)}$$

In the present modification example, the nozzle groups in the 4-level division pattern are arranged so that the appearance frequencies of the respective nozzle groups are the same (¼ each) in each row in the X direction and in each column in the Y direction. The dots allocated to different nozzle groups (in the present modification example, the nozzle memory group 1 and 2, the nozzle memory group 3 and 4, the nozzle memory group 5 and 6, and the nozzle memory group 7 and 8) are not to be ejected at the same timing. Therefore, the number of nozzles to be driven at the same time in the same nozzle array can be suppressed to ¼ of all the nozzles at maximum.

As explained above, in the first embodiment and the modification example, the nozzles to be controlled to eject ink can be almost evenly selected from the N×M nozzles, based on the number of levels N (N is equal to or less than 2) of the accumulation counter CntCum(y) and the number of nozzle groups M. Here, the nozzle groups are arranged so that the appearance frequencies of the respective nozzle groups are the same (1/N each) in each row in the X direction and in each column in the Y direction. Accordingly, the number of nozzles to be driven at the same time in the same nozzle array can be suppressed to 1/N of all the nozzles at maximum. Further, regarding the X direction, the address of the nozzle memories is changed according to the N levels of CntCum(y), based on the accumulation counter CntCum (y) that counts in a circulated manner in N levels each time a printing dot appears in a sequential manner without including not-printing data. Accordingly, it is possible to almost evenly divide the printing dots on the same printing line into nozzles of N or more nozzle arrays to form the printing dots.

Second Embodiment

Figure 13:
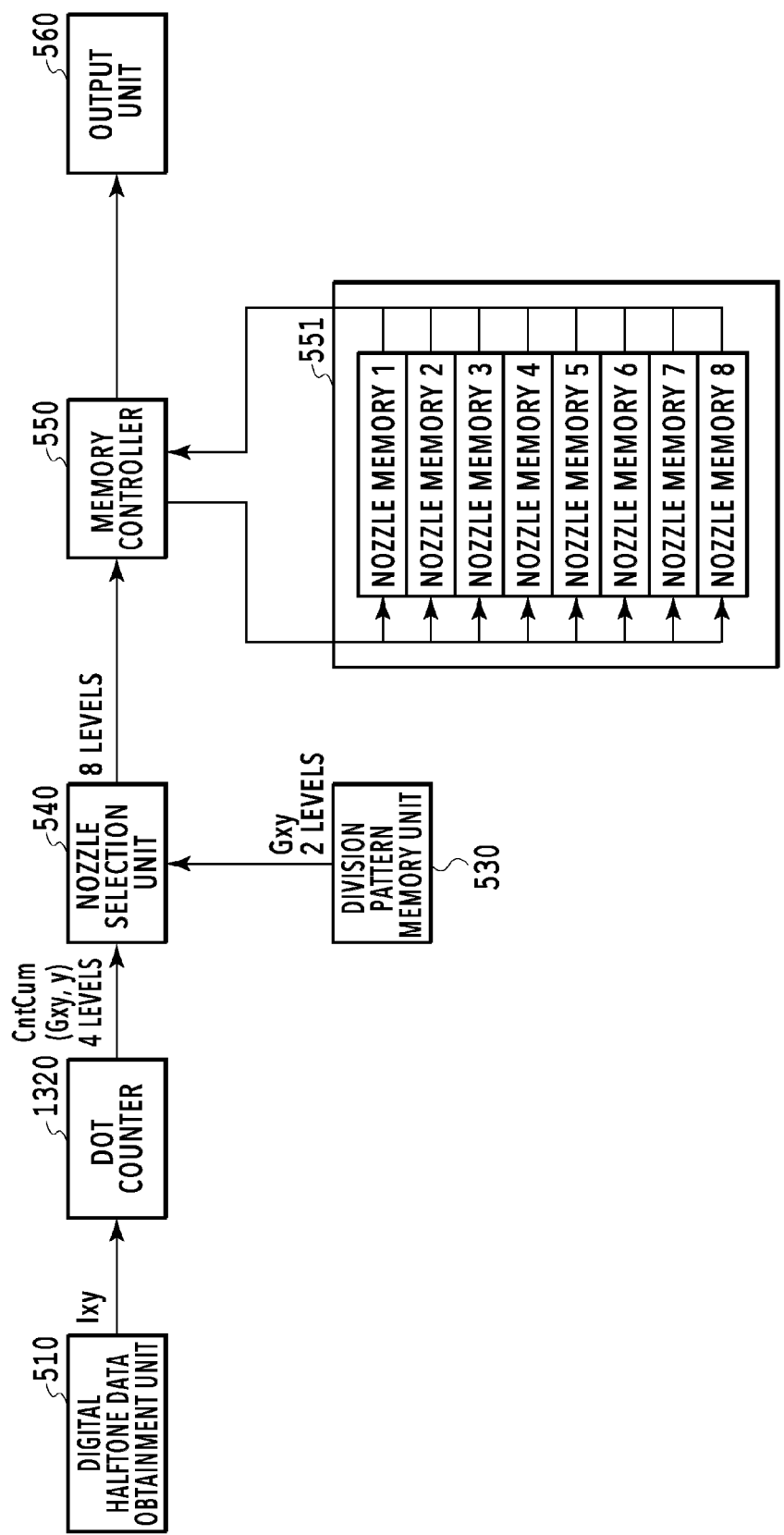
FIG. 13 is a block diagram illustrating a functional configuration of the nozzle allocation process according to the second embodiment.

The first embodiment is a configuration using the dot counter CntCum(y) which is common among the nozzle groups. However, in the second embodiment, the example using the dot counter CntCum(Gxy, y) which is different for each nozzle group will be explained. FIG. 13 is a block diagram representing the functional configuration for the nozzle allocation process according to the second embodiment of the present disclosure. Note that the same reference signs are attached to the configurations equivalent to the first embodiment so as to omit detailed explanations thereof.

The accumulation counter CntCum(Gxy, y) of the dot counter 1320 in the present embodiment scans the digital halftone data in the X direction (the conveyance direction) and performs accumulation-counting on the pixel value Ixy (the number of printing dots) of each pixel for each address y on a per nozzle group (Gxy) basis. This accumulation counter CntCum(Gxy, y) is a 2-bit (4-level) counter.

Figure 14:
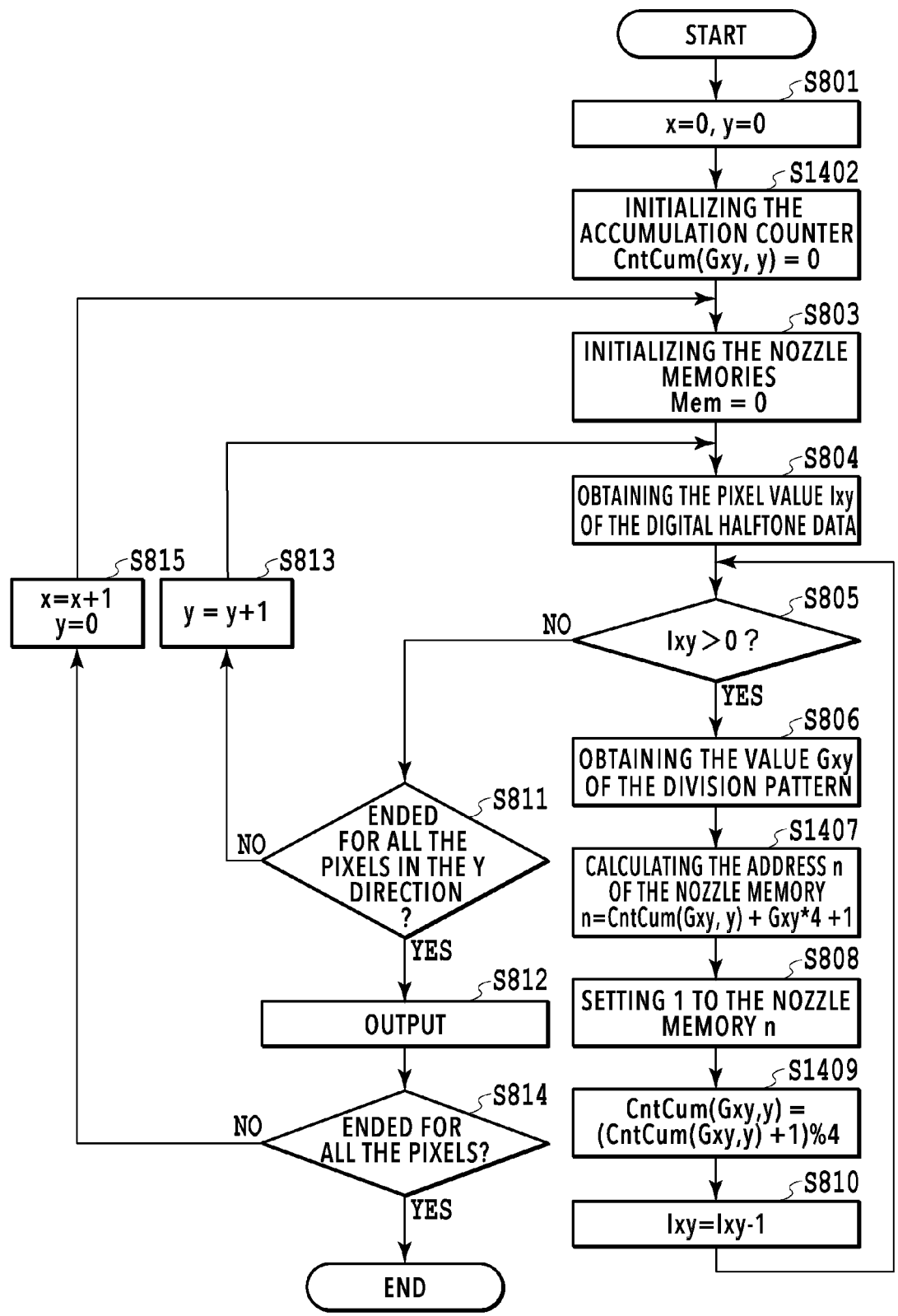
FIG. 14 is a flowchart of the nozzle allocation process according to the second embodiment.

FIG. 14 is a flowchart illustrating the processing procedure of allocating nozzles for digital halftone data in the second embodiment. Note that the same reference signs are attached to the processing procedures equivalent to the first embodiment so as to omit detailed explanations thereof. In the present embodiment, S802, S807, and S809 of the first embodiment illustrated in FIG. 8 are changed to S1402, S1407, and S1409 as described later.

In S1402, the multiple dot counters CntCum(Gxy, y) of the number corresponding to the signal values Gxy, which are indicative of the nozzle groups, are all initialized (CntCum(Gxy, y)=0).

In S1407, the nozzle selection unit 540 selects the nozzle to be used for forming a printing dot, based on the 4-level (0 to 3) counted values of the accumulation counter CntCum (Gxy) and the signal value Gxy of the 2-level (0, 1) division pattern. Then, with the formula below, the nozzle selection unit 540 determines the address n of the nozzle memory corresponding to the selected nozzle for which "1", which is indicative of causing the nozzle to form a printing dot, is to be stored.

$$n = CntCum(Gxy, y) + Gxy \times 4 + 1 \quad \text{(Formula 4)}$$

In S1409, the accumulation counter CntCum(Gxy, y), which corresponds to the signal value Gxy indicative of the nozzle group, counts up.

$$CntCum(Gxy, y) = (CntCum(Gxy, y) + 1)\%4 \quad \text{(Formula 5)}$$

Here, % is a remainder operator, which is an operation that obtains a remainder. Accordingly, a 2-bit (4-level) counted value is obtained.

Figure 15:
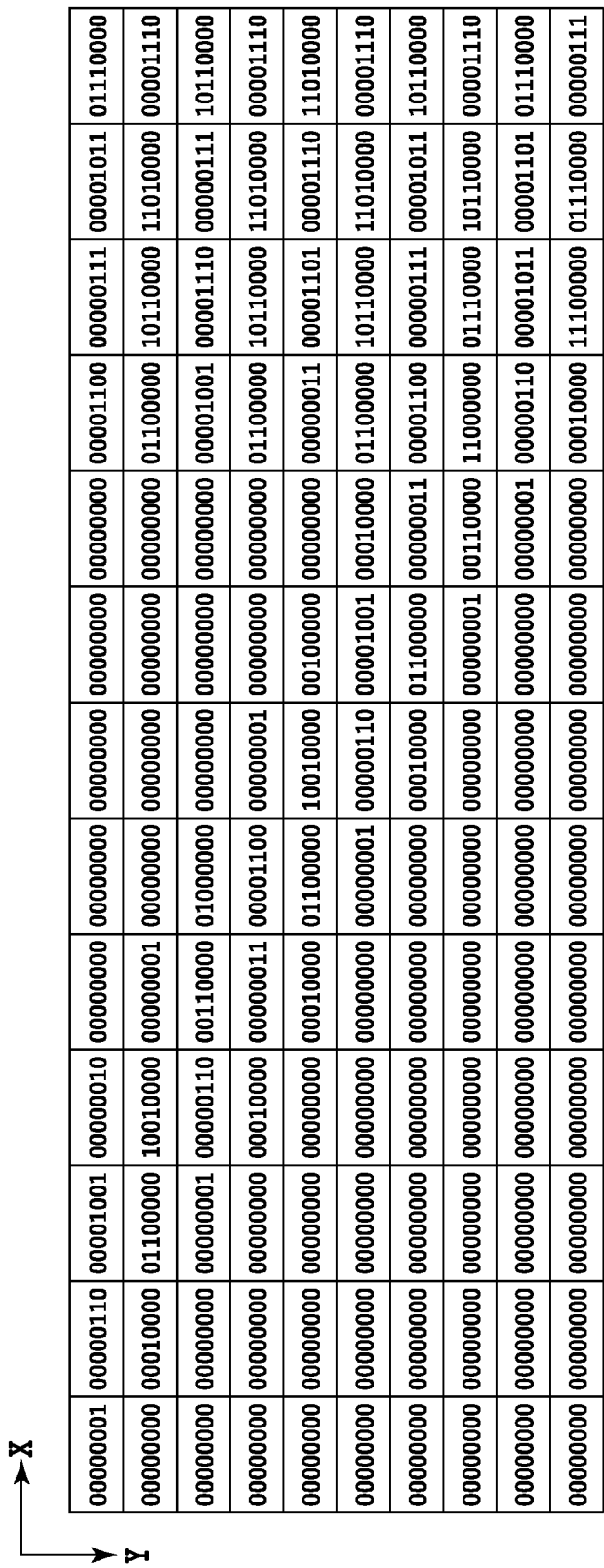
FIG. 15 is a diagram illustrating a result of the nozzle allocation process according to the second embodiment.

In FIG. 15, a result of the nozzle allocation performed on the digital halftone data illustrated in FIG. 6, based on the nozzle division pattern illustrated in FIG. 7A and FIG. 7B and the accumulation counters CntCum(Gxy, y) for the respective nozzle groups (Gxy) which are set in the division pattern. The numerical value of each cell (x, y) of the drawing is indicative of the output values (printing "1", not-printing "0") for the respective nozzle memories n (n=1 to 8) corresponding to each pixel (x, y) of the digital halftone data. As illustrated in the drawing, "1" is set for the number of nozzle memories corresponding to the pixel value Ixy (the number of printing dots) in the digital halftone data. In a case where Ixy is 0. "0" is set for all the nozzle memories. In a case where Ixy is 1, 2, or 3, "1" is set for one, two, or three nozzle memories of the eight nozzle memories in the respective cases, and "0" is set for the other nozzle memories.

Further, the allocation of the address n of a nozzle memory for which "1", which is indicative of causing the nozzle to form a printing dot, is to be stored is sequentially changed for each nozzle group. Accordingly, since only the printing data except for the not-printing data is sequentially allocated to the multiple nozzles on a per nozzle group basis, the nozzles that form printing dots can be evenly selected in a nozzle group. Accordingly, since disparity in the number of times of selection and the usage frequency of each nozzle is reduced and becomes even, the duration of the printing heads can be improved.

Third Embodiment

<Functional Configuration of the Information Processing Apparatus>

Figure 16:
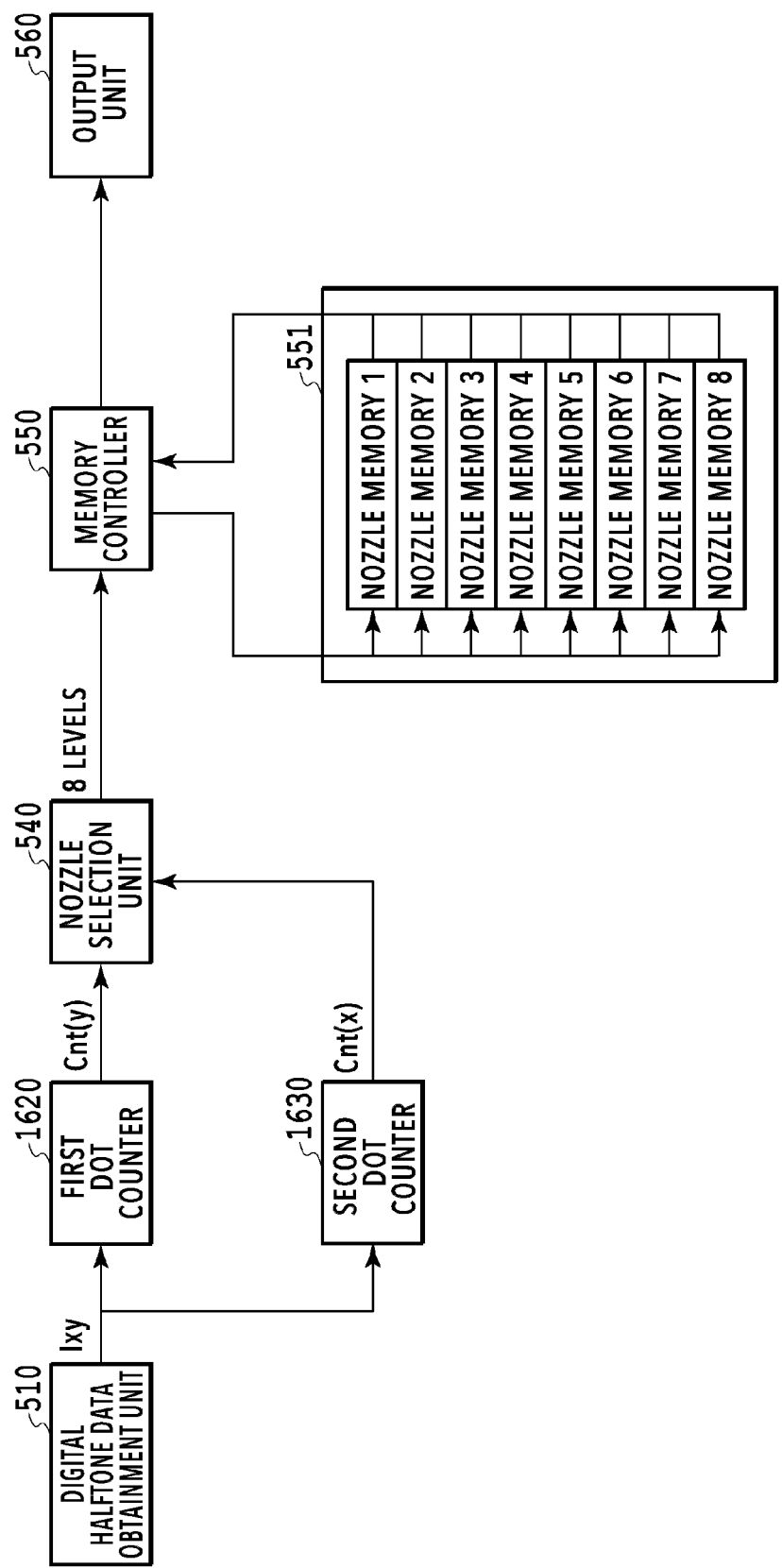
FIG. 16 is a block diagram illustrating a functional configuration of the nozzle allocation process according to the third embodiment.

FIG. 16 is a block diagram representing the functional configuration of the information processing apparatus for the nozzle allocation process according to the third embodiment. Note that the same reference signs are attached to the configurations equivalent to the first embodiment so as to omit detailed explanations thereof. In FIG. 16, the digital halftone data obtainment unit 510 outputs the pixel value Ixy which represents the number of printing dots in the target pixel (x, y) of digital halftone data. Here, x represents an address corresponding to the conveyance direction of the print medium, and y represents an address corresponding to the nozzle arranging direction of the printing heads. FIG. 17 is an example of digital halftone data, and each pixel holds the number of printing dots of 2 bits (0 to 3 dots).

Returning to FIG. 16, the first dot counter 1620 has the counter Cnt(y) which counts, for each nozzle array, the number of times each nozzle is selected for forming a printing dot from the nozzle set corresponding to pixels whose address y in the Y direction is the same in digital halftone data. The counter Cnt(y) has the number of counted values that is the same as the number of nozzles included in a nozzle set, that is, the number of nozzle arrays.

The second dot counter 1630 has the counter Cnt(x) which counts, for each nozzle array, the number of times each nozzle is selected for forming a printing dot at approximately the same time on pixels whose address x in the X direction is the same in digital halftone data. As with the counter Cnt(y), the counter Cnt(x) also has the number of counted values that is the same as the number of nozzles included in a nozzle set, that is, the number of nozzle arrays.

For each printing dot of the target pixel, the nozzle selection unit 540 selects a nozzle for forming the printing dot from each nozzle set, based on counted values indicated by the first dot counter 1620 (Cnt(y)) and the second dot counter 1630 (Cnt(x)). Further, the nozzle selection unit 540 determines the address corresponding to the selected nozzle from among the nozzle memories 1 to 8 of the memory 551. Each nozzle memory is a 1-bit line memory that stores ejection or not-ejection from one of the nozzles included in each nozzle set for the number of nozzle sets (the number of nozzles included in each nozzle array). By use of the nozzle memories 1 to 8, the memory 551 stores ejection "1" or not-ejection "0" of the nozzles of the nozzle arrays L1 to L8.

The memory controller 550 sets "1" to any one of the nozzle memories 1 to 8 in the memory 551, which is determined by the nozzle selection unit 540, or sets "0" to all the nozzle memories 1 to 8 (initialization). Further, the memory controller 550 reads out the data stored in the memory 551 for an output.

The output unit 560 outputs output data which is configured with signals from the nozzle memories 1 to 8 of the memory 551. The output data is 8-bit data indicative of ejection or not-ejection of each nozzle in the respective nozzle arrays of the printing heads 101 to 104.

According to the above-described configuration, the nozzles to be controlled to eject ink for forming the printing dots of each pixel of digital halftone data are selected, and the nozzle memories Mem(n, y)(n=1 to 8) corresponding to the selected nozzles are determined. The detailed flow thereof will be explained below.

Figure 18:
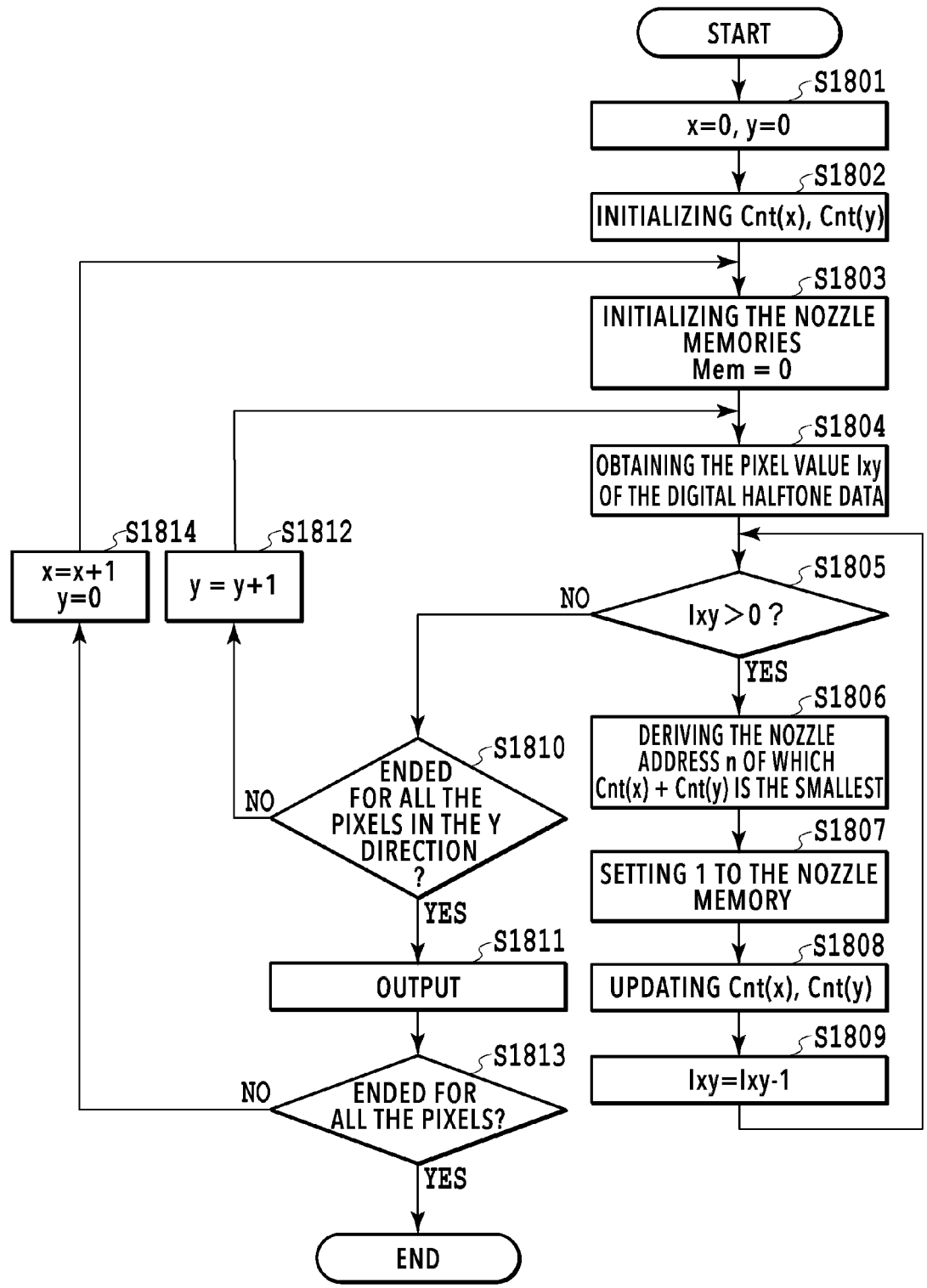
FIG. 18 is a flowchart of the nozzle allocation process according to the third embodiment.

FIG. 18 is a flowchart illustrating the processing procedure of allocating nozzles for digital halftone data in the present embodiment.

In S1801, the parameters x and y, which relate to a pixel address, are initialized.

In S1802, the first dot counter 1620 and the second dot counter 1630 initialize both of the counter Cnt(y) and the counter Cnt(x) (Cnt(x)=0, Cnt(y)=0).

In S1803, the memory controller 550 initializes the nozzle memories 1 to 8 to set "0" to all the memories.

In S1804, the digital halftone data obtainment unit 510 obtains the pixel value Ixy of the pixel address (x, y) of the digital halftone data.

In S1805, the nozzle selection unit 540 determines whether or not the pixel value Ixy is greater than 0. In a case where Ixy is 0, the processing proceeds to S1810, and, in a case where Ixy is greater than 0, the processing proceeds to S1806.

In S1806, the nozzle selection unit 540 selects, from the nozzle set corresponding to the pixel (x, y), the nozzle of which the value of adding the counted value of the counter Cnt(y) and the counted value of the counter Cnt(x) for each nozzle array is the smallest as the nozzle that forms a printing dot. Accordingly, the nozzle selection unit 540 derives the address n of the nozzle memory corresponding to the selected nozzle for which "1", which is indicative of causing the nozzle to form a printing dot with ink, is to be stored.

In S1807, the memory controller 550 sets "1" to the nozzle memory Mem(n, y) which corresponds to the address n of the nozzle memory for which "1", which is indicative of causing the nozzle to form a printing dot, is to be stored.

In S1808, the first dot counter 1620 and the second dot counter 1630 updates each of the counter Cnt(y) and the counter Cnt(x), based on the result of the selection by the nozzle selection unit 540.

In S1809, 1 is subtracted from the value of Ixy to newly set the obtained value as Ixy, and then the processing returns to S1805.

If Ixy is 0 in S1805 and the processing proceeds to S1810, whether or not the nozzle allocation for the pixels in the nozzle arranging direction (the Y direction) of the printing head in the address x of the digital halftone data has ended is determined in S1810. In a case where the nozzle allocation for the pixels in the Y direction in the address x has ended, the processing proceeds to S1811, and, if not, the processing proceeds to S1812.

In S1811, regarding the pixels having the address x of the digital halftone data, the output unit 560 reads out the signals indicative of the nozzles selected for forming the printing dots of those pixels from the memory 551 for an output.

In S1812, the pixel address is progressed by one pixel in the Y direction (x, y+1), and the processes from S1804 are repeated.

In S1813, whether the nozzle allocation has ended for all the pixels in the digital halftone data is determined, and, if the nozzle allocation has ended, the series of the nozzle allocation process will end, and, if not, the processing proceeds to S1814.

In S1814, the address x is progressed by one and the address y is initialized (x=x+1, y=0), and the processing returns to S1803.

Figure 19:
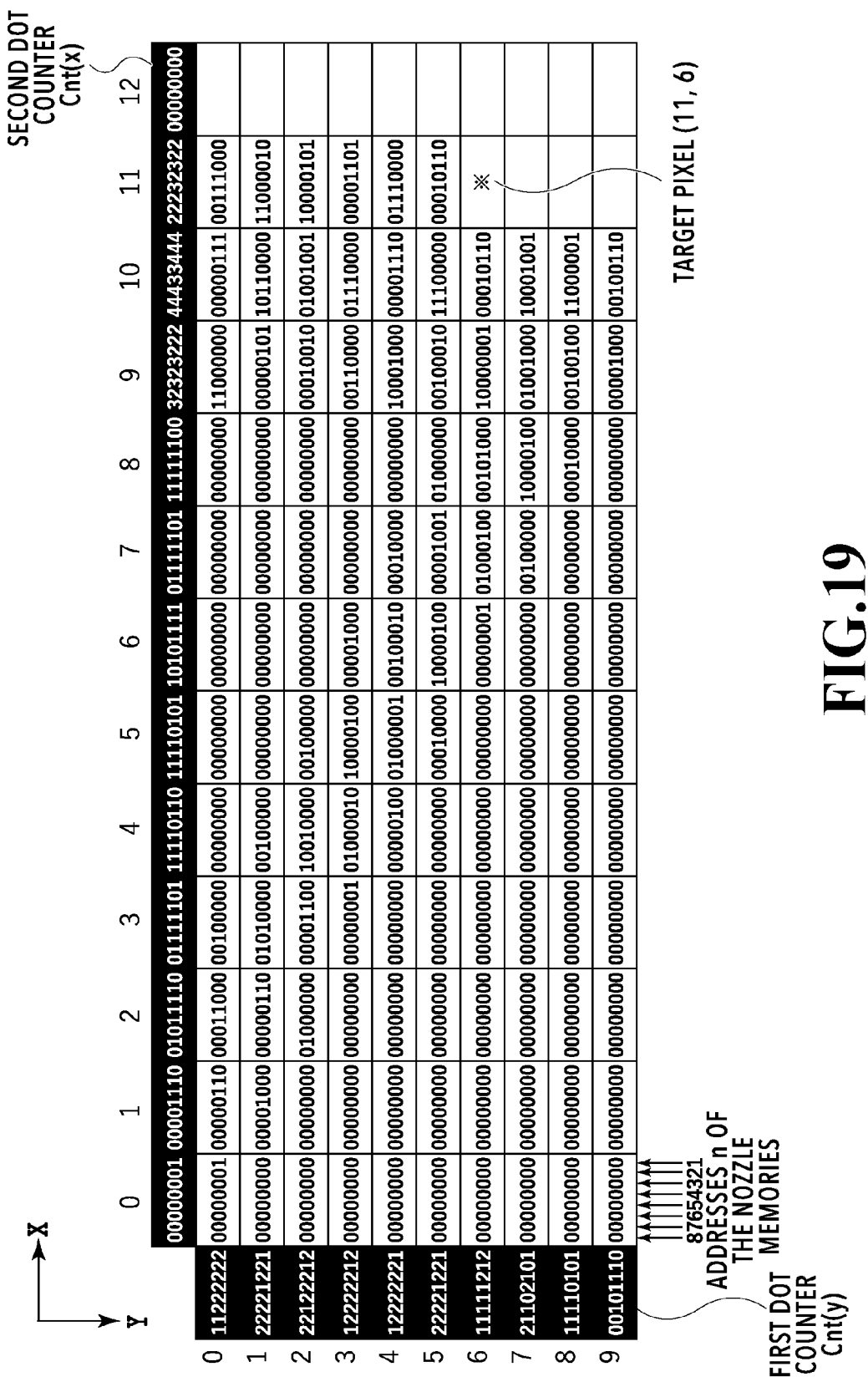
FIG. 19 is a diagram illustrating an example of the nozzle allocation process according to the third embodiment.

Here, with reference to FIG. 19, an example of the processing from S1805 to S1809 performed on the target pixel (11, 6) of the digital halftone data illustrated in FIG. 17 will be explained. The numerical value of each cell (x, y) in FIG. 19 is indicative of the values (printing "1", not-printing "0") stored in the respective nozzle memories n (n=8, 7, . . . , 1 from left) corresponding to each pixel (x, y) of the digital halftone data, which have already been allocated by the processing on the target pixel (11, 6). Further, the numerical values of the cells with the black background and white characters arranged in the Y direction are the counted values of the counter Cnt(y) which counts, for each nozzle array, the number of times each nozzle is selected for forming a printing dot from the nozzle set corresponding to pixels of the same address y. Further, ones that are arranged in the X direction are the counted values of the counter Cnt(x) which counts, for each nozzle array, the number of times each nozzle is selected for forming a printing dot at approximately the same time on pixels of the same address x.

As illustrated in the drawing, in each cell, "1" is set for the number of nozzle memories corresponding to the pixel value Ixy (the number of printing dots) of each pixel in the digital halftone data. In a case where Ixy is 0, "0" is set for all the nozzle memories. In a case where Ixy is 1, 2, or 3, "1" is set for one, two, or three nozzle memories of the eight memories in the respective cases, and "0" is set for the other nozzle memories.

Since the value of the pixel value Ixy (the number of printing dots) of the target pixel (11, 6) in the digital halftone data illustrated in FIG. 17 is 3, it is firstly determined in S1805 that Ixy is greater than 0. Next, in S1806, the address n of the nozzle memory corresponding to the nozzle array of which the value of adding the counted values of the corresponding counter Cnt(y) and counter Cnt(x) for each nozzle array is the smallest is calculated. Note that, in a case where there are multiple nozzle arrays of which the sum of the counted values is the smallest, the address n of the nozzle memory corresponding to a nozzle array that is randomly selected from the multiple nozzle arrays may be used.

The counted values of the counter Cnt(x) which counts, for each nozzle array, the number of times each nozzle is selected for forming a printing dot at approximately the same time on pixels (11, y) of which the address x is the same as that of the target pixel (11, 6) are (22232322). On the other hand, the counted values of the counter Cnt(y) which counts the number of nozzles of each nozzle array that are selected for forming a printing dot from the nozzle set corresponding to pixels (x, 6) of which the address y is the same as that of the target pixel (11, 6) are (11111212). The values of adding these counted values are (33343534), and the addresses n of the nozzle memories corresponding to the nozzle arrays with the smallest sum are 8, 7, 6, 4, and 2.

Here, if n=4 is derived in S1806, 1 is set to the nozzle memory of the address n=4 (00001000) in S1807 as the printing dot data corresponding to the target pixel.

Next, in S1808, 1 is added to the counted values of the address n=4 of the respective counters Cnt(x) and Cnt(y), so as to be Cxn=(22233322) and Cyn=(11112212).

Next, in S1809, 1 is subtracted from the value "3" of the pixel value Ixy, so that the value of Ixy becomes "2".

By repeating these processes from S1805 to S1809 until the value of Ixy becomes "0", the value to be stored in the nozzle memories as the printing dot data corresponding to the target pixel (11, 6) can be derived as (01101000), for example.

Note that the method of performing allocation of a nozzle memory by repeating the processes for selecting one address from the addresses corresponding to the nozzle arrays of which the sum of the counted values is the smallest for the number of printing dots is shown above. However, as another method, it is also possible to perform the allocation of a nozzle memory for the number of printing dots at once by selecting addresses in ascending order from the address corresponding to the nozzle array of which the value of adding two counted values is the smallest. For example, in the above-described example, the allocation can be performed by selecting three addresses from the addresses 8, 7, 6, 4, and 2, as with the above-described method.

With the above-described processes, the selection is performed in ascending order from the nozzle array of which the sum of the counted value of the first dot counter Cnt(y) and the counted value of the second dot counter Cnt(x) is the smallest. Therefore, regarding the nozzles selected for forming printing dots in the pixels whose address y is the same as that of the target pixel and the pixels whose address x is the same as that of the target pixel, it is possible to suppress variation among the nozzle arrays in the number of nozzles of each nozzle array.

Further, in the present embodiment, since a nozzle array is selected based on the sum of the counted values of Cnt(y) and the counted values of Cnt(x), the selection of a nozzle array is performed with a priority of nozzle arrays whose variation in the counted values of each counter (the maximum counted value—the minimum counted value) is larger. For example, in a case where the variation in the counted values of the first dot counter is 1 and the variation in the counted values of the second dot counter is 2, the nozzle array of which the sum of the counted values takes the smallest value tends to match the nozzle array corresponding to the minimum counted value of the second dot counter Cnt(x). As a result, the variation in the numbers of nozzles selected in the respective nozzle arrays that are counted by the second dot counter Cnt(x), which has the larger variation, will be suppressed.

Further, although the example of selecting nozzles of the nozzle array of which the sum of the counted values is the smallest has been explained, in a case where suppressing of the variation among the nozzle arrays in the counted values of either one of the counters is prioritized, it is also possible to weight the counted values of the one of the counters before summing up.

Further, it is also possible that, from the nozzle arrays of which the counted value of the prioritized counter is the smallest, the nozzle array of which the counted value of the other counter is the smallest will be selected.

Further, in a case where the counted value of the second dot counter Cnt(x) for each nozzle array reaches a predetermined number of nozzles capable of ejecting ink at approximately the same time, it is also possible not to select a nozzle from the nozzle array. Accordingly, since the number of nozzles to be driven at approximately the same time in each nozzle array can be suppressed to a predetermined number or less, so that each nozzle array can be stably driven.

In the present embodiment, it is possible to suppress variation among nozzle arrays in the number of time each nozzle is selected for forming a printing dot in the pixels corresponding to the pixels having the same address y in the Y direction of digital halftone data. That is, it is possible to suppress variation among nozzle arrays in the number of times each nozzle is selected for forming a printing dot in each nozzle set. Accordingly, it is possible to almost evenly select the nozzles to form the printing dots on the same printing line from multiple nozzle arrays. Further, regarding the nozzles selected for forming printing dots at approximately the same time in the pixels having the same address x in the X direction of digital halftone data, it is possible to reduce variation among the nozzle arrays in the number of nozzles of each nozzle array. Accordingly. variation among the nozzle arrays in the number of nozzles to be driven at approximately the same time in the same nozzle array can be suppressed.

As described above, in a printing apparatus equipped with a print head in which multiple nozzle arrays including multiple nozzles aligned in a predetermined direction are arranged, it is possible to suppress the number of nozzles that eject at the same time in each nozzle array and to suppress disparity in the number of times of selection and usage frequencies of the nozzles.

According to the technology of the present disclosure, it is possible to stably drive multiple nozzles included in a printing head while suppressing disparity in the usage frequency of each nozzle.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-027635 filed Feb. 24, 2021, and No. 2021-027642 filed Feb. 24, 2021, which are hereby incorporated by reference wherein in their entirety.

What is claimed is:

1. An information processing apparatus for controlling a printing apparatus including a printing head in which a plurality of nozzle arrays having a plurality of nozzles that eject ink being aligned in a predetermined direction are arranged, so as to perform printing of each pixel with each nozzle set, which includes one nozzle each from each nozzle array, the information processing apparatus comprising:
an obtainment unit configured to obtain digital halftone data which is configured with a plurality of pixels each of which holds a pixel value indicative of the number of printing dots to be formed with ink that is ejected from nozzles;
an allocation unit configured to set a plurality of nozzle groups that evenly divide the plurality of nozzles included in each nozzle set and allocate one of the plurality of nozzle groups to each pixel of the digital halftone data so that appearance frequencies of the respective nozzle groups are approximately even; and
a selection unit configured to select the number of nozzles corresponding to a pixel value of a pixel from among a plurality of nozzles that are set as one of the nozzle groups allocated to the pixel out of a plurality of nozzles included in the nozzle set corresponding to each pixel of the digital halftone data, so that disparity in the number of times of selection is reduced, and output a signal indicative of the selected nozzles in association with the pixel.

2. The information processing apparatus according to claim 1,
wherein frequencies of the respective nozzle groups of the plurality of nozzle groups appear in each nozzle array are approximately even.

3. The information processing apparatus according to claim 1,
wherein the nozzle groups that are set for adjacent nozzles of the plurality of nozzles included in each nozzle array are different.

4. The information processing apparatus according to claim 1,
wherein frequencies of the respective nozzle groups of the plurality of nozzle groups appear in the digital halftone data are approximately even.

5. The information processing apparatus according to claim 1,
wherein the selection unit determines the nozzles to be selected in a predetermined order, based on a counted value of accumulation-counting on the pixel value of each pixel in the digital halftone data corresponding to each nozzle set.

6. The information processing apparatus according to claim 1,
wherein the selection unit determines the nozzles to be selected in a predetermined order, based on a counted value of counting on the pixel value of each pixel in the digital halftone data corresponding to each nozzle set for each nozzle group allocated to the pixel.

7. The information processing apparatus according to claim 1,
wherein the number of nozzle groups is set according to the number of nozzles capable of ejecting ink at approximately the same time from among the plurality of nozzles included in each nozzle array.

8. An information processing method for controlling a printing apparatus including a printing head in which a plurality of nozzle arrays having a plurality of nozzles that eject ink being aligned in a predetermined direction are arranged, so as to perform printing of each pixel with each nozzle set, which includes one nozzle each from each nozzle array, the information processing method comprising:
obtaining digital halftone data which is configured with a plurality of pixels each of which holds a pixel value indicative of the number of printing dots to be formed with ink that is ejected from nozzles;
setting a plurality of nozzle groups that evenly divide the plurality of nozzles included in each nozzle set and allocating one of the plurality of nozzle groups to each pixel of the digital halftone data so that appearance frequencies of the respective nozzle groups are approximately even; and
selecting the number of nozzles corresponding to a pixel value of a pixel from among a plurality of nozzles that are set as one of the nozzle groups allocated to the pixel out of a plurality of nozzles included in the nozzle set corresponding to each pixel of the digital halftone data, so that disparity in the number of times of selection is reduced, and outputting a signal indicative of the selected nozzles in association with the pixel.

9. A non-transitory computer-readable storage medium storing a program that causes a computer to execute an information processing method for controlling a printing apparatus including a printing head in which a plurality of nozzle arrays having a plurality of nozzles that eject ink being aligned in a predetermined direction are arranged, so as to perform printing of each pixel with each nozzle set, which includes one nozzle each from each nozzle array, the information processing method comprising:
obtaining digital halftone data which is configured with a plurality of pixels each of which holds a pixel value indicative of the number of printing dots to be formed with ink that is ejected from nozzles;
setting a plurality of nozzle groups that evenly divide the plurality of nozzles included in each nozzle set and allocating one of the plurality of nozzle groups to each pixel of the digital halftone data so that appearance frequencies of the respective nozzle groups are approximately even; and
selecting the number of nozzles corresponding to a pixel value of a pixel from among a plurality of nozzles that are set as one of the nozzle groups allocated to the pixel out of a plurality of nozzles included in the nozzle set corresponding to each pixel of the digital halftone data, so that disparity in the number of times of selection is reduced, and outputting a signal indicative of the selected nozzles in association with the pixel.

* * * * *